United States Patent
Ikegaya (10) Patent No.: US 12,330,763 B2
(45) Date of Patent: Jun. 17, 2025

(54) MARINE VESSEL PROPULSION CONTROL SYSTEM AND MARINE VESSEL

(71) Applicant: YAMAHA HATSUDOKI KABUSHIKI KAISHA, Iwata (JP)

(72) Inventor: Yuji Ikegaya, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 273 days.

(21) Appl. No.: 17/960,935

(22) Filed: Oct. 6, 2022

(65) Prior Publication Data
US 2023/0192263 A1 Jun. 22, 2023

(30) Foreign Application Priority Data
Dec. 21, 2021 (JP) .................................. 2021-207062

(51) Int. Cl.
| | | |
|---|---|---|
| *B63H 25/42* | (2006.01) | |
| *B63H 25/02* | (2006.01) | |
| *B63H 25/04* | (2006.01) | |

(52) U.S. Cl.
CPC .............. *B63H 25/42* (2013.01); *B63H 25/04* (2013.01); *B63H 2025/026* (2013.01); *B63H 2025/045* (2013.01)

(58) Field of Classification Search
CPC ..................................................... B63H 25/42
See application file for complete search history.

(56) References Cited

U.S. PATENT DOCUMENTS

| | | | | |
|---|---|---|---|---|
| 10,464,653 | B2 * | 11/2019 | Anderson | ............ B63H 20/007 |
| 11,254,402 | B1 * | 2/2022 | Poirier | .................... F02D 41/10 |
| 2008/0243365 | A1 * | 10/2008 | Altman | .................. B63H 25/42 |
| | | | | 701/116 |
| 2011/0166724 | A1 | 7/2011 | Hiramatsu | |

(Continued)

FOREIGN PATENT DOCUMENTS

| | | | |
|---|---|---|---|
| JP | 2002234494 A | | 8/2002 |
| JP | 4709684 B2 | * | 6/2011 |

(Continued)

OTHER PUBLICATIONS

Yamaha Motor Co., Ltd., "Helm Master EX", https://global.yamaha-motor.com/business/outboards/products/accessories/hm-ex/, Retrieved from the Internet, Sep. 15, 2022, pp. 1-9.

(Continued)

*Primary Examiner* — Jean Paul Cass
(74) *Attorney, Agent, or Firm* — Keating & Bennett, LLP (57) ABSTRACT

A marine vessel includes a marine vessel propulsion control system including a display and a controller configured or programmed to control movement of the marine vessel and to execute fixed point holding control to restrict movement of the marine vessel to keep the marine vessel at a predetermined position. When a target position is newly set during the fixed point holding control, the controller is configured or programmed to move the marine vessel to the target position. The display is operable to display a remaining distance as the marine vessel is moving to the target position. The controller is configured or programmed to change, according to a movement state of the marine vessel, a thrust level to be generated by a propulsion device during the fixed point holding control.

13 Claims, 10 Drawing Sheets

(56) References Cited

U.S. PATENT DOCUMENTS

| | | | |
|---|---|---|---|
| 2017/0144740 A1 | 5/2017 | Ito et al. | |
| 2018/0015994 A1 | 1/2018 | Kishimoto et al. | |
| 2018/0057132 A1* | 3/2018 | Ward | B63H 21/213 |
| 2019/0300138 A1 | 10/2019 | Akuzawa et al. | |
| 2022/0189312 A1* | 6/2022 | Ma | G05D 1/0206 |

FOREIGN PATENT DOCUMENTS

| | | | |
|---|---|---|---|
| JP | 2011-140272 A | | 7/2011 |
| JP | 5000244 B2 | | 8/2012 |
| JP | 2017-094945 A | | 6/2017 |
| RU | 169161 U1 | * | 3/2017 |
| WO | 2014065147 A1 | | 5/2014 |

OTHER PUBLICATIONS

Extended European Search Report in EP22197460.3, mailed May 26, 2023, 8 pages.

* cited by examiner

MARINE VESSEL PROPULSION CONTROL SYSTEM AND MARINE VESSEL

CROSS REFERENCE TO RELATED APPLICATIONS

This application claims the benefit of Japanese Patent Application No. 2021-207062, Dec. 21, 2021, which is hereby incorporated by reference herein in its entirety.

BACKGROUND OF THE INVENTION

1. Field of the Invention

The present invention relates to a marine vessel propulsion control system and a marine vessel.

2. Description of the Related Art

In a small marine vessel such as a boat, it is preferable that, when a person on board is fishing, the marine vessel stays at one point and the person on board continues fishing at the one point. In recent years, fixed point holding control is performed for restricting the movement of the marine vessel so that the marine vessel stays at one point (see, for example, Japanese Laid-open Patent Publication (Kokai) No. 2011-140272).

On some occasions, the person on board may fish at one location and then fish at another location. To cope with this, a function called fine tuning for moving the marine vessel to a new target position during the fixed point holding control is provided on the marine vessel (see, for example, "HELM MASTE EX", [online], Yamaha Motor Co., Ltd., [searched on Dec. 8, 2021], see the Internet <URL:https://global.yamaha-motor.com/business/outboards/products/accessories/hm-ex/>). The fine tuning is a function by which when the vessel operator sets a new target position on the display using a joystick, and the marine vessel under the fixed point holding control moves toward the target position.

However, setting of a new target position is often performed off-shore, and there is no target object on land near the marine vessel by which the vessel operator is able to check the relative movement of the marine vessel such that it is difficult for the vessel operator to realize that the marine vessel is moving toward the new target position during execution of the fine tuning. That is, there is room for improvement during fine tuning from the viewpoint of making the user (vessel operator) realize the effect of the function.

SUMMARY OF THE INVENTION

Preferred embodiments of the present invention allow a user to easily realize movement of marine vessels toward new target points.

According to a preferred embodiment of the present invention, a marine vessel includes a marine vessel propulsion control system including a display, at least one memory to store a set of instructions, and a controller configured or programmed to execute the set of instructions to control movement of the marine vessel, and to execute a fixed point holding control to restrict movement of the marine vessel so as to keep the marine vessel at a predetermined position, wherein when a target position is newly set during execution of the fixed point holding control, the controller is configured or programmed to execute a control to move the marine vessel to the target position, the display displays a remaining distance from the marine vessel to the target position as the marine vessel is moving to the target position, and the controller is configured or programmed to change, according to a movement state of the marine vessel to the target position, a thrust level to be generated by a propulsion device of the marine vessel during execution of the fixed point holding control.

According to this configuration, since the display displays the remaining distance from the marine vessel to the new target position as the marine vessel is moving to the new target position, the user is able to realize that the marine vessel is moving toward the new target position by checking the change in the remaining distance displayed on the display. In addition, the controller is configured or programmed to change, according to the movement state of the marine vessel to the new target position, the thrust level to be generated by the propulsion device of the marine vessel during the execution of the fixed point holding control. For example, in a case where the marine vessel is caused to move in a direction different from the new target position by the wind or a tidal current, the controller is configured or programmed to increase the thrust level. As a result, it is possible to avoid a state in which the marine vessel does not swiftly reach the new target position, and, as a result, a change in the remaining distance displayed on the display is not delayed. Therefore, the user is able to easily realize that the marine vessel is moving toward the new target point.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
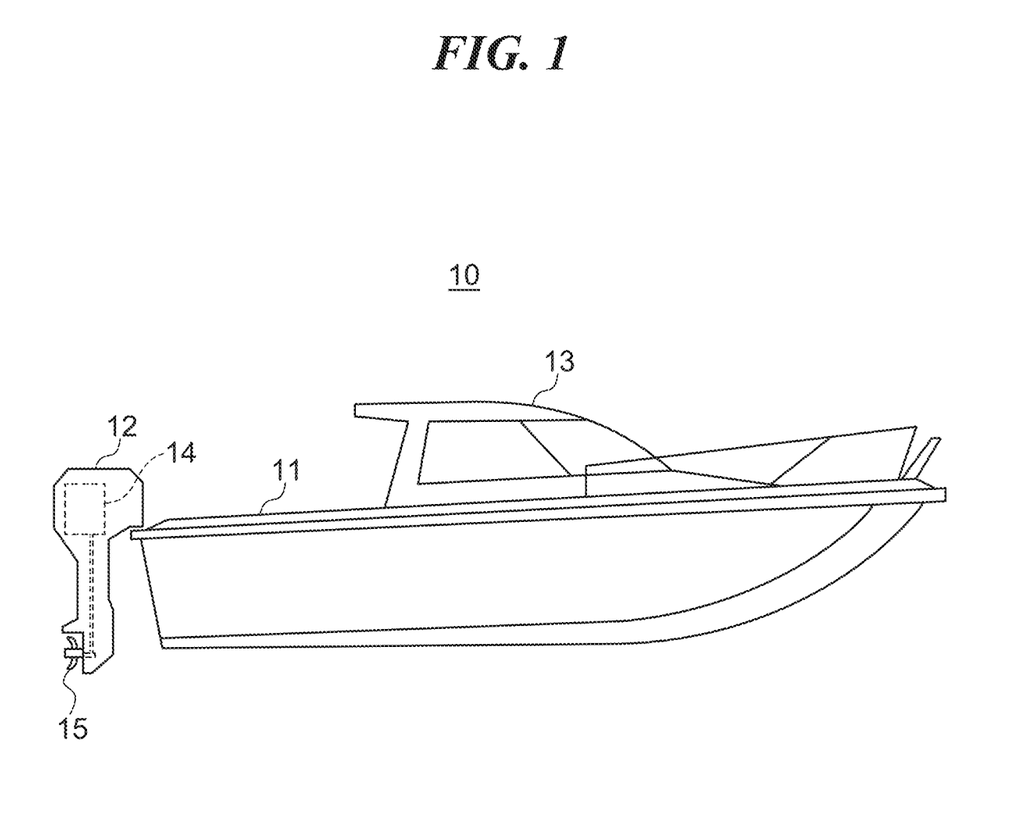
FIG. 1 is a side view of a marine vessel to which a marine vessel propulsion control system according to a preferred embodiment of the present invention is applied.

Hereinafter, preferred embodiments of the present invention will be described with reference to the drawings. FIG. 1 is a side view of a marine vessel 10 to which a marine vessel propulsion control system according to a preferred embodiment of the present invention is applied. The marine vessel 10 is a planing boat, for example, and includes a hull 11 and at least two outboard motors 12 as propulsion devices mounted on the hull 11. A cabin 13 also functioning as a cockpit is disposed in the hull 11. The outboard motor 12 includes an engine 14 as a power source and a propeller 15 as a thrust generator, and applies thrust to the marine vessel 10 by the propeller 15 being rotated by a driving force of the engine 14. The outboard motor 12 is horizontally swung with respect to the hull 11 to adjust the acting direction of the thrust generated by the outboard motor 12 and adjust the course of the marine vessel 10. Note that the number of outboard motors 12 provided on the marine vessel 10 is not limited to two, and may be three or more. Each outboard motor 12 may include an electric motor as a power source, or may include both an engine and an electric motor as power sources.

Figure 2:
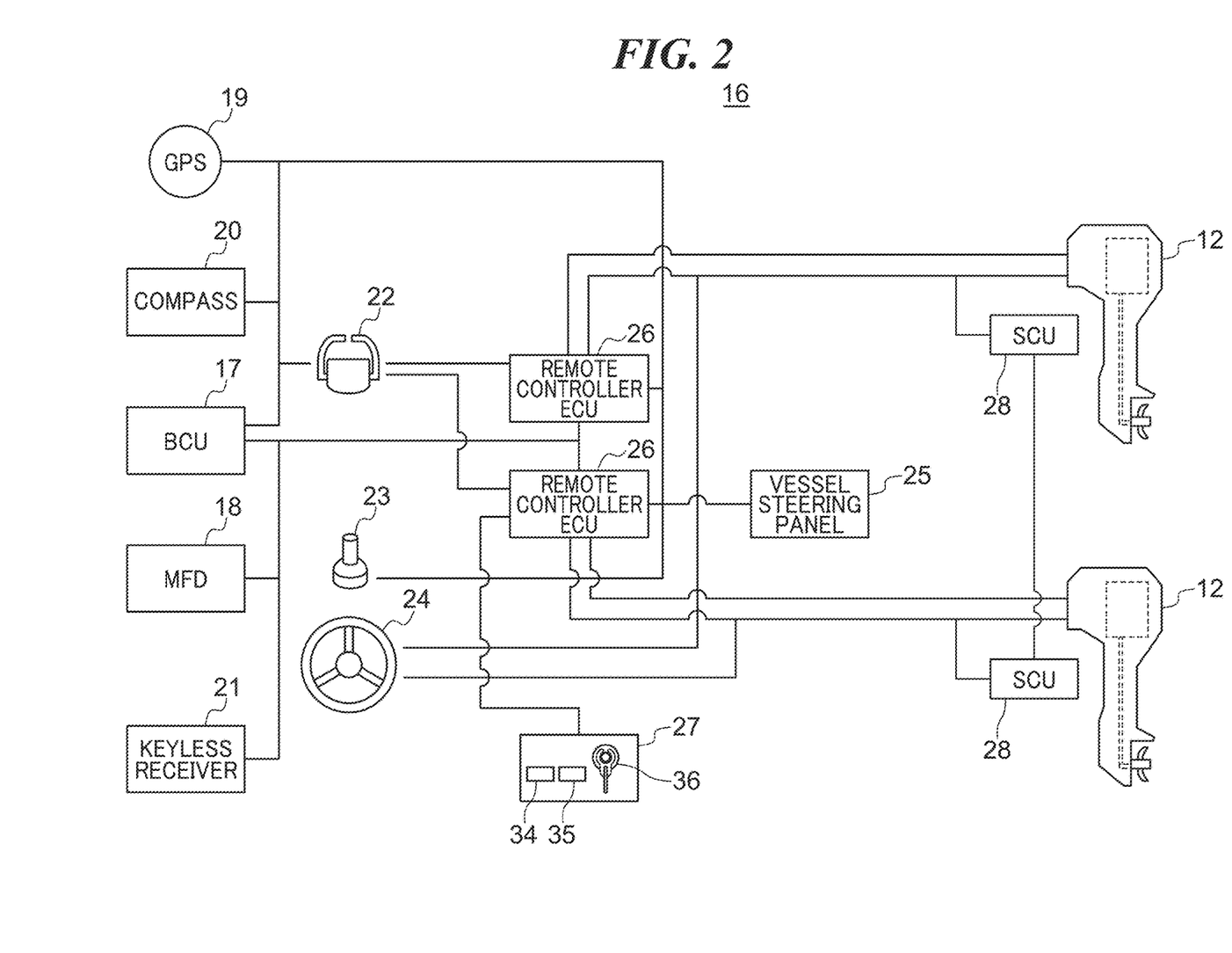
FIG. 2 is a block diagram schematically illustrating a configuration of a marine vessel propulsion control system mounted on the marine vessel in FIG. 1.

FIG. 2 is a block diagram schematically illustrating a configuration of a marine vessel propulsion control system 16 mounted on the marine vessel 10 in FIG. 1. Referring to FIG. 2, the marine vessel propulsion control system 16 includes the outboard motor 12, a boat control unit (BCU) 17 (a control unit, a controller), a multi-function display (MFD) 18 (a display unit), a GPS 19, a compass 20, a keyless receiver 21, a remote controller 22, a joystick 23, a steering wheel 24, a vessel steering panel 25, a remote controller ECU 26, a switch panel 27, and a steering control unit (SCU) 28. The components of the marine vessel propulsion control system 16 are communicatively connected to one another.

The GPS 19 determines the current position of the marine vessel 10 and transmits the current position of the marine vessel 10 to the BCU 17 as positional information. The compass 20 determines the bearing (bow direction) of the marine vessel 10 and transmits the bearing of the marine vessel 10 to the BCU 17. The MFD 18 is a display indicating a vessel speed and an engine speed, includes a touch panel, and receives an input from a vessel operator. The content of the received input is transmitted to the BCU 17.

Figure 3:
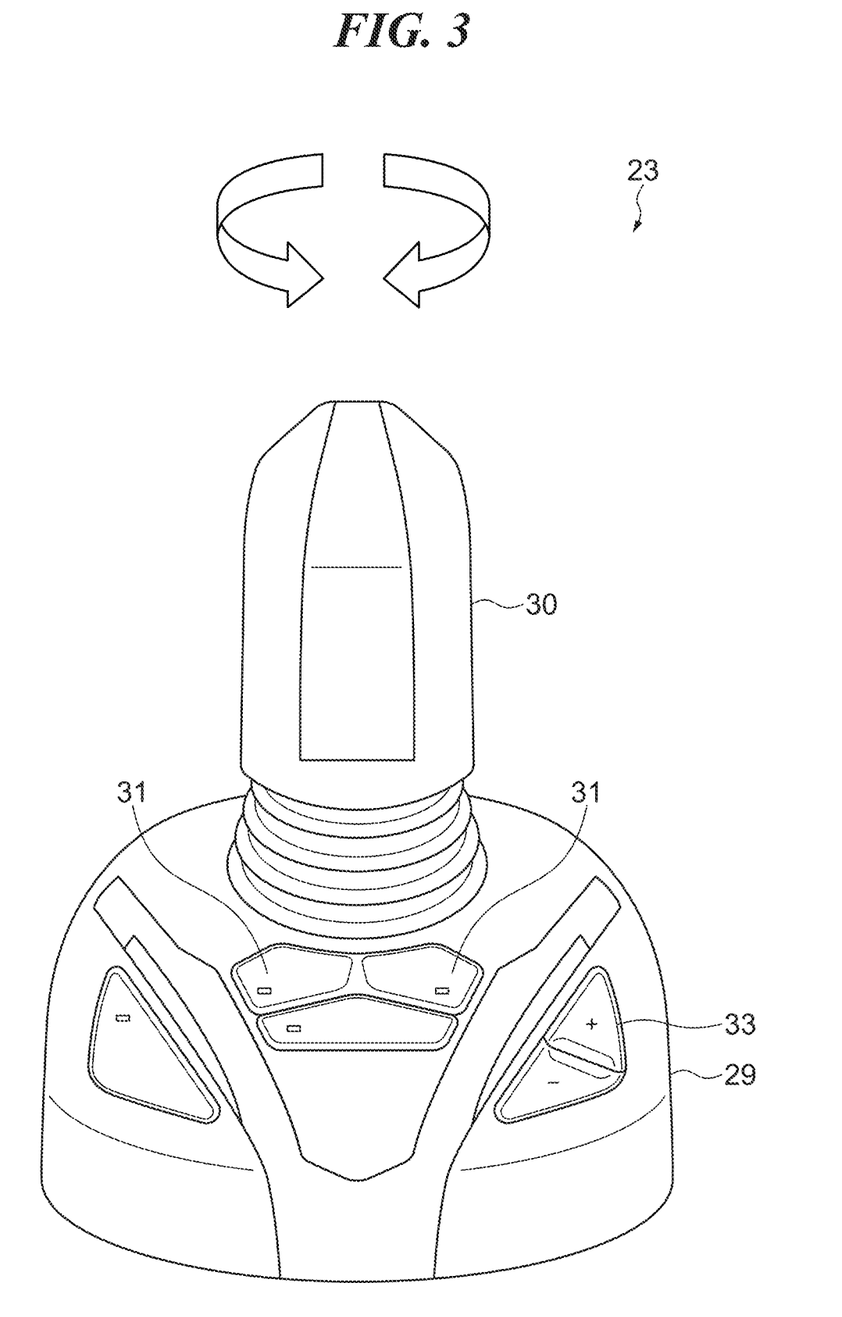
FIG. 3 is an external view schematically illustrating a configuration of a joystick in FIG. 2.

FIG. 3 is an external view schematically illustrating a configuration of the joystick 23 in FIG. 2. In FIG. 3, the joystick 23 includes a base 29, a stick 30 attached to the top of the base 29, and a plurality of buttons 31 and 33 provided on the base 29. The stick 30 is swingable with respect to the base 29 and is configured so that the vessel operator is able to intuitively steer the marine vessel 10. For example, the vessel operator tilting the stick 30 back and forth causes the joystick 23 to transmit a signal to move the marine vessel 10 back and forth, and the vessel operator tilting the stick 30 left and right causes the joystick 23 to transmit a signal to move the marine vessel 10 left and right. Further, the stick 30 is able to be twisted (turned) with respect to the base 29 (see an arrow in the figure). When the vessel operator twists the stick 30, the joystick 23 emits a signal to turn the marine vessel 10. A signal from the joystick 23 is transmitted to each remote controller ECU 26 and the BCU 17.

Various vessel steering modes are assigned to the buttons 31 of the joystick 23. In response to the depression of each button 31, the joystick 23 transmits an instruction signal to start/end the vessel steering mode corresponding to the depressed button 31 to each remote controller ECU 26 and the BCU 17. The vessel steering mode selectable by each button 31 includes, for example, a Fish Point (registered trademark) or a Stay Point (registered trademark) as fixed point holding control. Details of the Fish Point™ and the Stay Point™ will be described below.

In addition, the vessel operator is also able to set, using the joystick 23, the level of the thrust (the level of the position adjustment thrust) (hereinafter, it is referred to as a "thrust level") that is to be generated by the engine 14 of each outboard motor 12 in order to adjust the position of the marine vessel 10 when the Fish Point™ or the Stay Point™ is executed. Specifically, when the vessel operator depresses the "+" side of the button 33 provided in the base 29, the thrust level increases, and when the vessel operator depresses the "−" side of the button 33, the thrust level decreases. The joystick 23 transmits the content of the operation input to the button 33 to the BCU 17, and the BCU 17 changes the thrust level according to the content of the operation input to the button 33.

The vessel steering panel 25 also includes buttons similar to the buttons 31 and 33. The vessel operator is able to select a Fish Point™ or a Stay Point™ as a vessel steering mode on the vessel steering panel 25, and able to set a thrust level.

Referring to FIG. 2 again, the steering wheel 24 receives the steering operation of the vessel operator and transmit a steering angle corresponding to the received operation to each remote controller ECU 26.

The switch panel 27 includes an ignition switch 34, a start/stop switch 35, and an engine shut-off switch 36. The ignition switch 34 is a switch to start/stop the supply of electric power to the engine 14 of each outboard motor 12. The start/stop switch 35 is a switch to activate/stop the engine 14 of each outboard motor 12 in response to an operation input. The engine shut-off switch 36 is a switch to immediately stop the engine 14 of each outboard motor 12. Operation inputs to the ignition switch 34, the start/stop switch 35, and the engine shut-off switch 36 are transmitted to the BCU 17 and each remote controller ECU 26.

The keyless receiver 21 is a radio wave receiver that receives a signal of an operation input of an external key (not illustrated) as a radio wave. For example, the keyless receiver 21 receives a signal of an operation received by an ignition switch or a start/stop switch of the external key and transmits these signals to the BCU 17 and each remote controller ECU 26.

The SCU 28 is provided correspondingly to each outboard motor 12, and controls a steering unit (not illustrated) that horizontally turns the corresponding outboard motor 12 with respect to the hull 11 of the marine vessel 10 to change the acting direction of the thrust of each outboard motor 12.

The BCU 17 determines the situation of the marine vessel 10 based on the signals transmitted from the respective components of the marine vessel propulsion control system 16, determines the thrust to be generated by each outboard motor 12 and the acting direction of the thrust, and transmits the result to each remote controller ECU 26. One remote controller ECU 26 is provided correspondingly to each outboard motor 12. Each remote controller ECU 26 controls the engine 14 and the steering unit of the corresponding outboard motor 12 according to a signal transmitted from the BCU 17, the remote controller 22, the joystick 23, or the like, and adjusts the thrust and the acting direction of the thrust of the outboard motor 12. Therefore, in the marine vessel propulsion control system 16, the vessel operator is able to control the vessel speed and the bow direction of the marine vessel 10 by operating the lever of the joystick 23 or the remote controller 22.

Figure 4A:
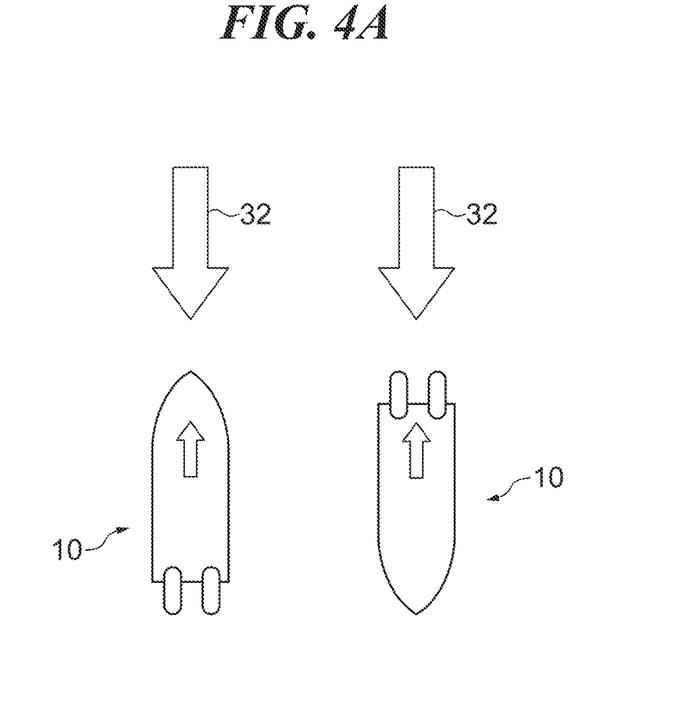
FIGS. 4A and 4B are diagrams for explaining fixed point holding control executed in the marine vessel in FIG. 1.
Figure 4B:
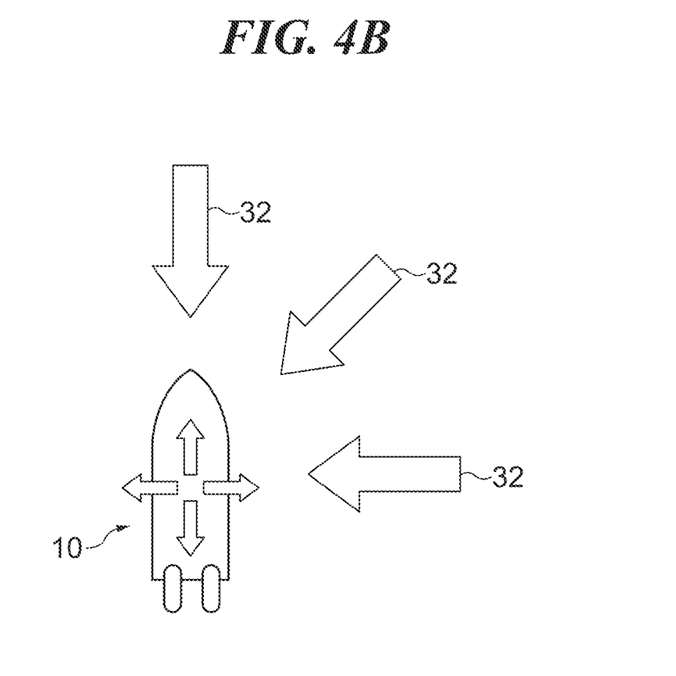

FIGS. 4A and 4B are diagrams for explaining a fixed point holding control executed in the marine vessel 10. FIG. 4A illustrates the Fish Point™ and FIG. 4B illustrates the Stay Point™. Referring to FIG. 4A, in the Fish Point™, for example, when the marine vessel 10 stays at a predetermined point (predetermined position), the marine vessel 10 moves away from the predetermined point due to a disturbance 32 such as wind or water flow. Then, the BCU 17 controls the engine 14 and the steering unit of each outboard motor 12 to adjust the thrust and the acting direction of the thrust of the outboard motor 12 so that the bow or the stern of the marine vessel 10 faces against the wind flow or the water flow and the marine vessel 10 is kept at a predetermined point. Referring to FIG. 4B, in the Stay Point™, for example, when the marine vessel 10 stays at a predetermined point, the marine vessel 10 moves away from the predetermined point or the bow direction changes due to a disturbance 32 such as wind or water flow. Then, the BCU 17 controls the engine 14 and the steering unit of each outboard motor 12 to adjust the thrust and the acting direction of the thrust of the outboard motor 12 so as to maintain the bow direction of the marine vessel 10 in a set predetermined direction (for example, the bow direction when the Stay Point™ is started) and keep the marine vessel 10 at a predetermined point. The level of the thrust generated by the engine 14 of each outboard motor 12 when the Fish Point™ and the Stay Point™ are executed is the above-described thrust level.

Incidentally, there is a case where the vessel operator desires to move the marine vessel 10 when the fixed point holding control is executed in the marine vessel 10. For example, in some cases, when a person on board the marine vessel 10 is fishing, the person may fish at one point and then follow a fish school and fish at another point. In this case, since it is preferable that the fixed point holding control is continuously executed still at another point, in recent years, a function called fine tuning to allow the marine vessel 10 during the fixed point holding control to move is provided on the marine vessel 10.

Figure 5A:
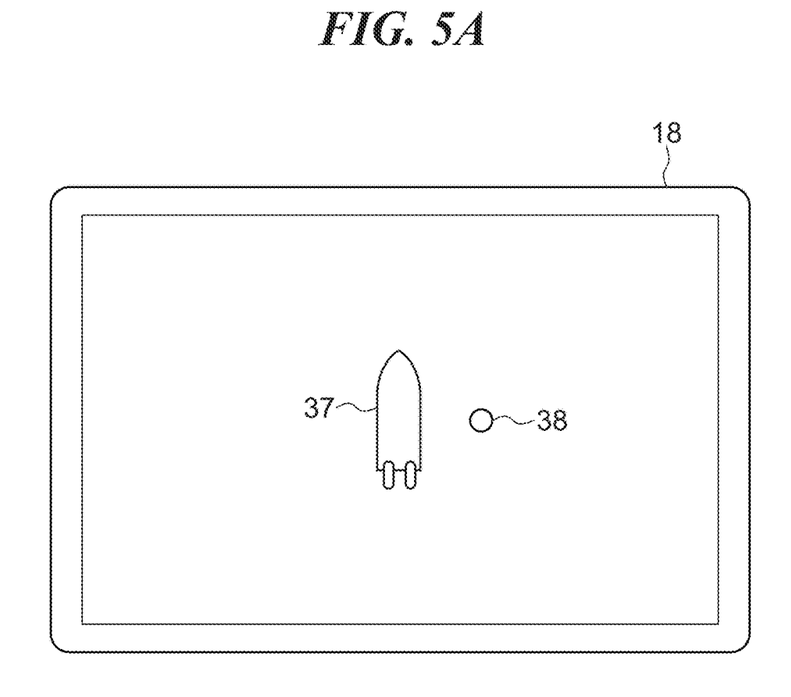
FIGS. 5A and 5B are diagrams for explaining a method of setting a new target point during fine tuning.
Figure 5B:
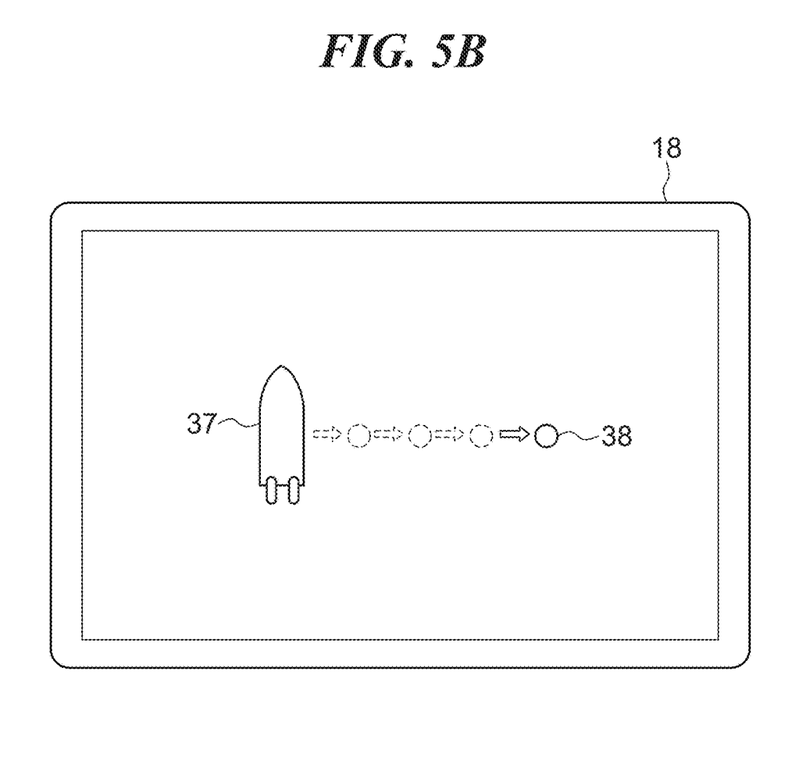

FIGS. 5A and 5B are diagrams for explaining a method of setting a new target point during fine tuning. When performing fine tuning, the vessel operator switches the display content of the MFD 18 to a fine tuning setting screen, and then sets a new target point (target position) on the MFD 18. Specifically, a new target point 38, which is a movement destination, is set with an icon 37 indicating the present marine vessel displayed on the MFD 18 as a reference (FIG. 5A). The new target point 38 is able to be moved according to the operation of the stick 30 of the joystick 23. Specifically, when the stick 30 is tilted once, a predetermined point in the Fish Point™ or the Stay Point™ moves by a predetermined amount of movement, and then when the stick 30 is returned to the neutral position, the predetermined point is updated to the new target point 38 moved by a predetermined amount of movement. The vessel operator is able to move the new target point 38 to a desired position by repeating tilting of the stick 30 (FIG. 5B). While the new target point 38 is set and fine tuning is executed (during movement to the new target point 38), the stick 30 is located at the neutral position. Note that the new target point 38 is able to be set only with respect to the left-right direction or the front-rear direction of the marine vessel 10 with the marine vessel 10 as a reference.

The set new target point 38 is transmitted from the MFD 18 to the BCU 17. When the new target point 38 is set, the BCU 17 temporarily stops the fixed point holding control, and controls the engine 14 and the steering unit of each outboard motor 12 to move the marine vessel 10 toward the new target point 38. Then, after the marine vessel 10 reaches the new target point 38, the BCU 17 resumes the fixed point holding control. The level of the thrust generated by the engine 14 of each outboard motor 12 when the marine vessel 10 moves to the new target point 38 during the fine tuning is the above-described thrust level.

Figure 6A:
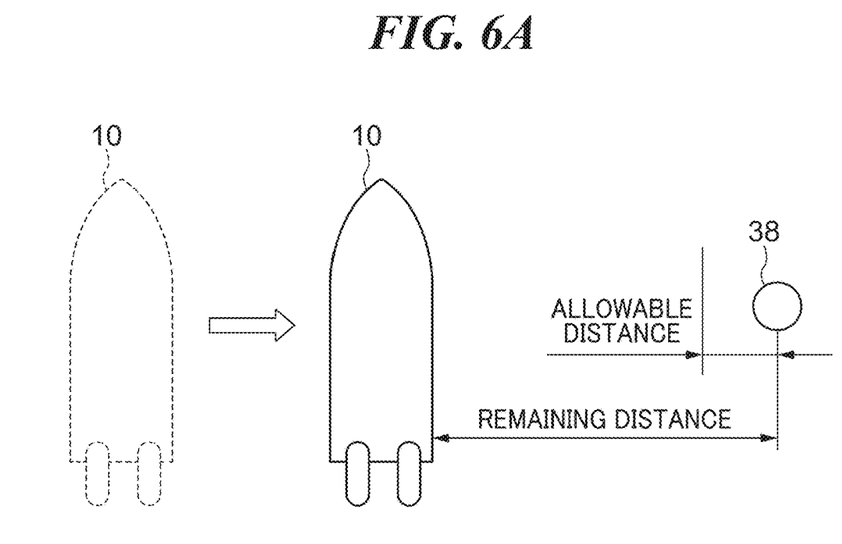
FIGS. 6A and 6B are diagrams for explaining a case where a new target point is set with respect to the left-right direction of the marine vessel during the fine tuning.
Figure 6B:
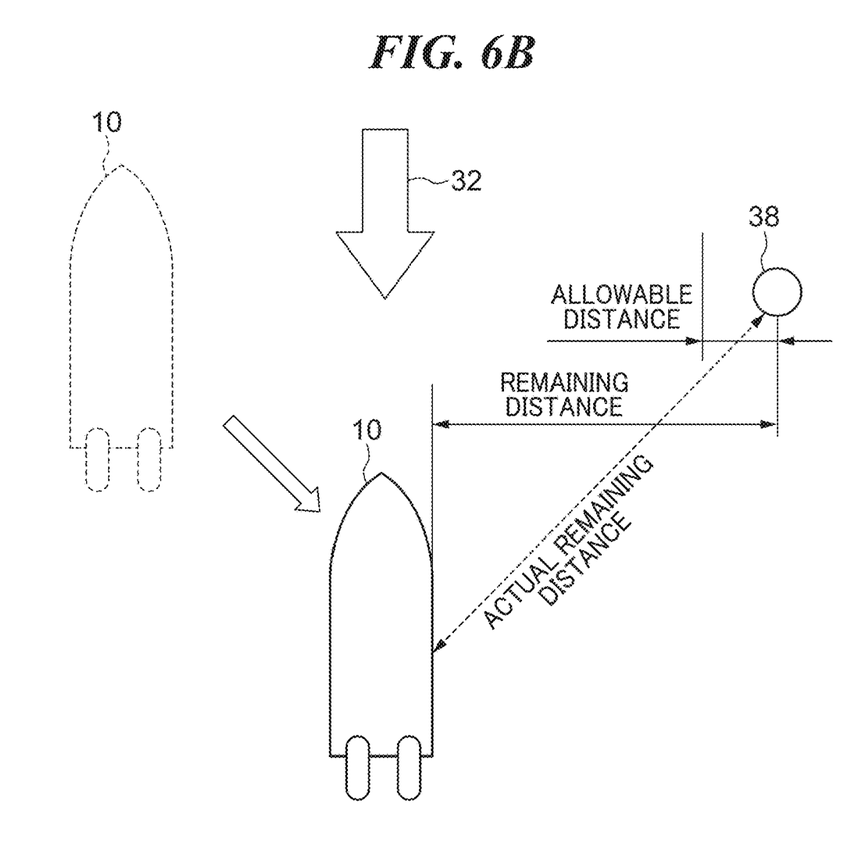

FIGS. 6A and 6B are diagrams for explaining a case where a new target point is set with respect to the left-right direction of the marine vessel 10 during the fine tuning.

When the marine vessel 10 moves during execution of the fine tuning, the marine vessel 10 receives a disturbance such as wind or water flow. Therefore, it is difficult for the marine vessel 10 to accurately reach the new target point 38, and fine adjustment of the position is needed to be repeated near the new target point 38. For this reason, the vessel operator feels a disadvantage that the marine vessel 10 does not swiftly reach the new target point 38. On the other hand, fine tuning is movement from one point to another point on the sea unlike the time of bringing the hull 11 alongside a quay. That is, there is no inconvenience unless the movement is not accurate and the hull 11 collides with the quay wall, thus damaging the hull 11, for example. Therefore, during the fine tuning in the present preferred embodiment, a concept of an allowable distance is used.

The allowable distance is a distance from the new target point 38 that is used considering that the marine vessel 10 has reached the new target point 38 even when the marine vessel 10 has not completely and accurately reached the new target point 38. Specifically, as illustrated in FIG. 6A, when the distance from the marine vessel 10 to the new target point 38 (hereinafter, referred to as "remaining distance") falls below the allowable distance, it is determined that the marine vessel 10 has reached the new target point 38. In other words, when the marine vessel 10 reaches a position within the allowable distance from the new target point 38, it is determined that the marine vessel 10 has reached the new target point 38. As a result, it is possible to eliminate the need for the marine vessel 10 to repeat fine adjustment of the position in the vicinity of the new target point 38. The remaining distance is calculated by the BCU 17 based on the current position of the marine vessel 10 determined by the GPS 19.

The allowable distance is not uniform, and varies depending on, for example, the amount of movement (the amount of movement when the stick 30 is tilted once) (hereinafter, referred to as an "adjustment distance") of the new target point 38 when the stick 30 of the joystick 23 is tilted once at the time of setting the new target point 38. Specifically, when the adjustment distance is large, the moving speed of the marine vessel 10 during fine tuning increases, which makes it more difficult to cause the marine vessel 10 to accurately reach the new target point 38. Therefore, the allowable distance is larger as the adjustment distance is larger. An example of the relationship between the adjustment distance and the allowable distance is shown in Table 1 below.

TABLE 1

| Adjustment distance | Allowable distance |
| --- | --- |
| 1.5 m (5 ft) | 1 m (3 ft) |
| 5 m (15 ft) | 1 m (3 ft) |
| 10 m (30 ft) | 2 m (6 ft) |
| 20 m (60 ft) | 3 m (9 ft) |
| 30 m (90 ft) | 3 m (9 ft) |

As a result, it is possible to reduce or prevent a situation in which the remaining distance is unlikely to fall below the allowable distance due to the high moving speed, and it is possible to avoid the vessel operator from feeling a disadvantage that the marine vessel 10 does not swiftly reach the new target point 38. In the present preferred embodiment, the vessel operator is able to change the adjustment distance at a desired timing using the MFD 18 or the like.

The allowable distance may be changed according to the thrust level. Specifically, when the thrust level is high, the moving speed of the marine vessel 10 during fine tuning is high. Therefore, the higher thrust level, the larger allowable distance.

As described above, since fine tuning is movement from one point to another point on the sea, there is no target object on land near the marine vessel 10 that is used by the vessel operator to check the relative movement of the marine vessel 10. Therefore, it is difficult for the vessel operator to realize that the marine vessel 10 is moving toward the new target position during execution of the fine tuning.

In the present preferred embodiment, in order to cope with this, the remaining distance is displayed for the vessel operator during execution of the fine tuning. Specifically, the MFD 18 keeps displaying the remaining distance that changes with the movement of the marine vessel 10.

Figure 7:
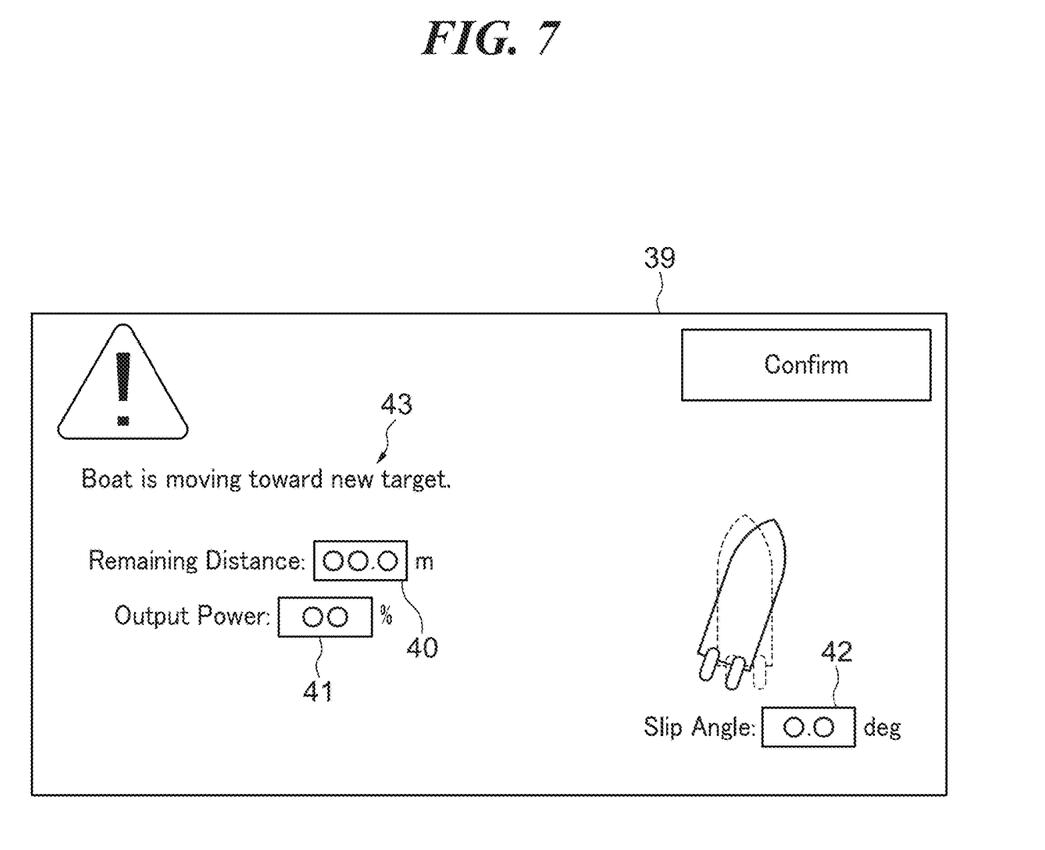
FIG. 7 is a diagram illustrating a dialog for displaying a remaining distance.

FIG. 7 is a diagram illustrating a dialog for displaying a remaining distance. While the marine vessel 10 is moving toward the new target point 38 during execution of the fine tuning, a dialog 39 in FIG. 7 displays a remaining distance 40, the maximum power ratio 41 of the engine 14 ("current output/maximum output" of the engine 14) (the operation state of the propulsion device), and a deviation angle 42 of the current bow direction with respect to the bow direction at the time when the new target point 38 was set. The dialog 39 also displays a message 43 indicating that the marine vessel 10 is moving toward the new target point 38. The remaining distance 40 decreases as the marine vessel 10 approaches the new target point 38. By checking the decrease in the remaining distance 40, the vessel operator is able to realize that the marine vessel 10 is moving toward the new target position.

When the remaining distance falls below the allowable distance and it is determined that the marine vessel 10 has reached the new target point 38, and the fine tuning is ended, the marine vessel 10 is stopped. Therefore, the dialog 39 displays the remaining distance 40 as "0" at the timing when the remaining distance falls below the allowable distance to notify the vessel operator that the fine tuning has ended.

However, at the timing when the remaining distance falls below the allowable distance, the marine vessel 10 has not reached the new target point 38, so that the actual remaining distance is not 0. Therefore, if the dialog 39 continues to display the actual remaining distance as the remaining distance 40 during the fine tuning, the remaining distance 40 displayed decreases as the marine vessel 10 approaches the new target point 38, and the remaining distance 40 displayed suddenly represents "0" at the timing when the actual remaining distance falls below the allowable distance giving an unnatural impression to the vessel operator.

Therefore, in the present preferred embodiment, not the actual remaining distance but the remaining distance (hereinafter, it is referred to as a "converted remaining distance") converted so as to decrease as the marine vessel 10 approaches the new target point 38 and to naturally become 0 at the timing when the actual remaining distance falls below the allowable distance is displayed as the remaining distance 40 of the dialog 39.

Figure 8:
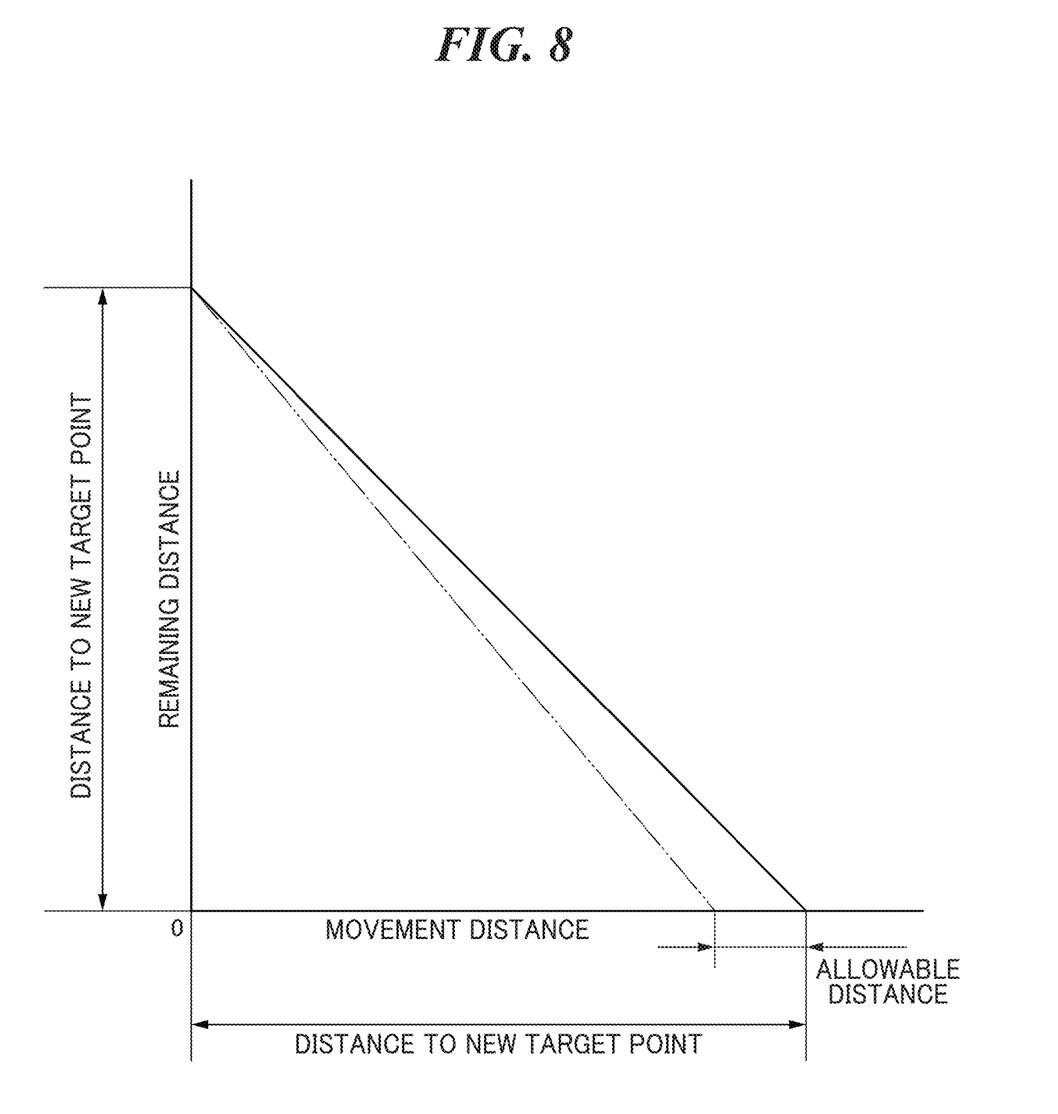
FIG. 8 is a graph for explaining a relationship between an actual remaining distance and a converted remaining distance.

FIG. 8 is a graph for explaining a relationship between an actual remaining distance and a converted remaining distance. In the graph of FIG. 8, the horizontal axis represents the movement distance of the marine vessel 10 during fine tuning, and the vertical axis represents the remaining distance. The actual remaining distance is indicated by a solid line, and the converted remaining distance is indicated by a two-dot chain line. As illustrated in FIG. 8, each of the actual remaining distance and the converted remaining distance is indicated by a line segment. The line segment representing the actual remaining distance intersects with the vertical axis and the horizontal axis at a position corresponding to the distance to the new target point 38. On the other hand, the line segment representing the converted remaining distance intersects with the vertical axis at a position corresponding to the distance to the new target point 38, and intersects with the horizontal axis at a position corresponding to the distance obtained by subtracting the allowable distance from the distance to the new target point 38. The remaining distance 40 is displayed according to the converted remaining distance in this manner. Therefore, when the remaining distance 40 decreases during the fine tuning, the remaining distance does not suddenly represent "0" at the timing when the remaining distance falls below the allowable distance, but continuously reaches "0", which gives a natural impression to the operator. As a result, the dialog 39 avoids giving an unnatural impression to the vessel operator regarding the display of the remaining distance 40.

As described above, the dialog 39 displays the maximum power ratio 41 and the deviation angle 42 during execution of the fine tuning. While the marine vessel 10 moves toward the new target point 38 during execution of the fine tuning, each engine 14 basically keeps operating, and thus the maximum power ratio 41 does not become 0. In addition, since the yaw angle tends to change due to disturbance such as water resistance or a water flow at the time of movement, the deviation angle 42 changes. Therefore, the vessel operator is able to understand that the marine vessel 10 is moving toward the new target point 38 by checking that the maximum power ratio 41 is not 0 and the change in the deviation angle 42. Note that if the remaining distance 40 is displayed in the dialog 39, the maximum power ratio 41 and the deviation angle 42 may not need to be displayed.

When the remaining distance falls below the allowable distance and it is determined that the marine vessel 10 has reached the new target point 38, the dialog 39 deletes the message 43 and displays the remaining distance 40 as "0". Alternatively, the display of the remaining distance 40 itself may be deleted, and further, the display of the dialog 39 itself may be deleted in the MFD 18.

As described above, during the fine tuning, since the new target point 38 is able to be set only with respect to the left-right direction or the front-rear direction of the marine vessel 10, the marine vessel 10 basically moves only in the left-right direction or the front-rear direction during execution of the fine tuning. However, the marine vessel 10 may be subjected to the disturbance 32 such as wind and water flow, and thus may not be able to move straight toward the new target point 38. For example, referring to FIG. 6B, there is a case where the marine vessel 10 is subjected to the disturbance 32 from the bow direction while moving toward the new target point 38. In this case, although the new target point 38 is set to right of the marine vessel 10, the marine vessel 10 does not move straight toward the new target point 38 and moves to the starboard rear side.

At this time, if the actual remaining distance from the marine vessel 10 to the new target point 38 (see a broken arrow in the figure) is displayed as the remaining distance 40 in the dialog 39, although the marine vessel 10 is moving, the remaining distance 40 does not decrease but rather may increase, which may cause confusion to the vessel operator.

Therefore, in the present preferred embodiment, during execution of the fine tuning, regarding the actual distance from the marine vessel 10 to the new target point 38, only the component (see "remaining distance" in FIG. 6B) along the direction (hereinafter, referred to as a "set moving direction") (the left-right direction in FIG. 6B) from the position of the marine vessel 10 at the time point when the new target point 38 is set to the new target point 38 is displayed as the remaining distance 40. To be precise, the component, of the converted remaining distance, in the set moving direction is displayed as the remaining distance 40. In addition, only the component in the set moving direction (see "allowable distance" in FIG. 6B) is also considered as the allowable distance, and whether the new target point 38 is reached is determined based on the component of the allowable distance in the set moving direction.

As a result, even when the marine vessel 10 does not move straight toward the new target point 38 due to the disturbance 32, the remaining distance 40 keeps decreasing during execution of the fine tuning, and thus, it is possible to prevent confusion of the vessel operator.

Figure 9A:
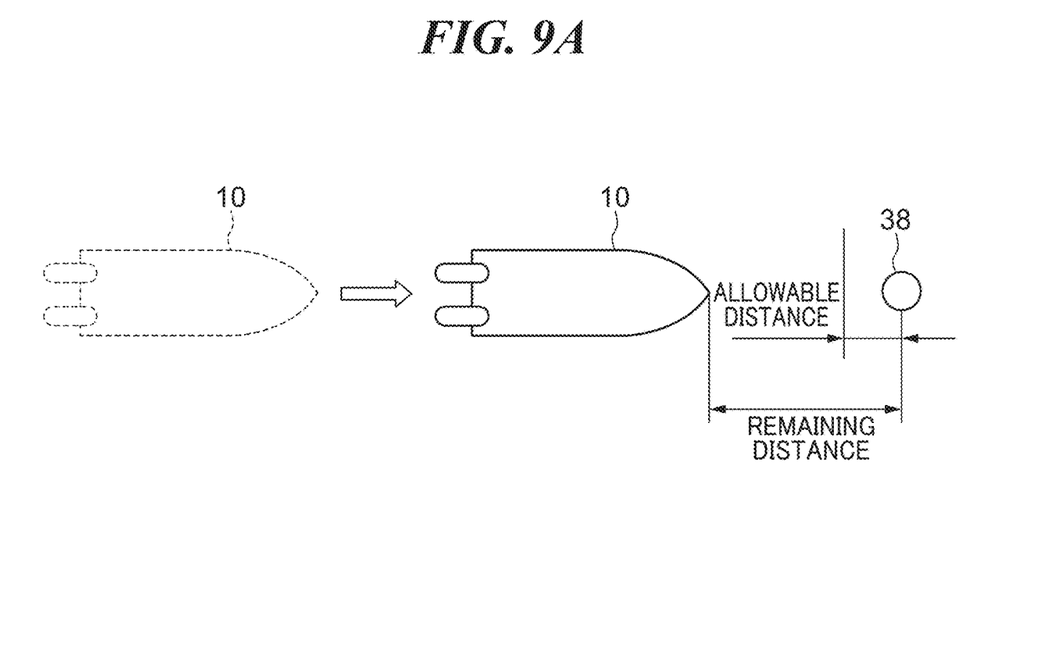
FIGS. 9A and 9B are diagrams for explaining a case where a new target point is set with respect to the front-rear direction of the marine vessel during the fine tuning.
Figure 9B:
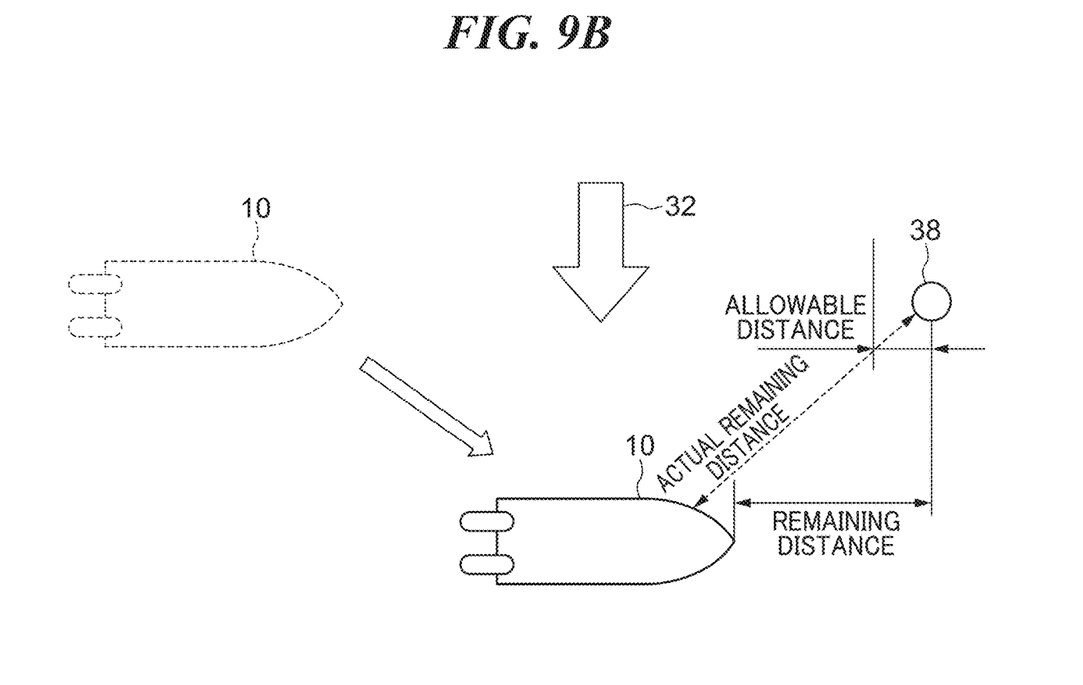

Referring to FIGS. 6A and 6B, the case where the new target point 38 is set with respect to the left-right direction of the marine vessel 10 during fine tuning is described above, similar processing is performed in a case where the new target point 38 is set with respect to the front-rear direction of the marine vessel 10. Specifically, in a case where the new target point 38 is set with respect to the front-rear direction (the forward direction in FIGS. 9A and 9B) of the marine vessel 10, whether the marine vessel 10 has reached the new target point 38 is determined using the allowable distance as illustrated in FIG. 9A. Further, the remaining distance is displayed during execution of the fine tuning, wherein the remaining distance to be displayed is a converted remaining distance. Further, as illustrated in FIG. 9B, when the marine vessel 10 cannot move straight toward the new target point 38 set in the forward direction due to the disturbance 32, only a component along the set moving direction (the forward direction in FIG. 9B) of the actual distance from the marine vessel 10 to the new target point 38 is displayed as the remaining distance.

In addition, when the marine vessel 10 is subjected to a large disturbance, particularly, a disturbance in a direction opposite to the set moving direction during execution of the fine tuning, the marine vessel 10 does not swiftly reach the new target point 38. In some cases, the marine vessel 10 may move away from the new target point 38. For this reason, the change in the remaining distance 40 displayed by the dialog 39 is delayed, which may make it difficult for the vessel operator to realize that the marine vessel 10 is moving toward a new target position during execution of the fine tuning.

Therefore, in the present preferred embodiment, the thrust level is changed according to the movement state of the marine vessel 10 during execution of the fine tuning. Specifically, during execution of the fine tuning, in a case where the marine vessel 10 moves away from the new target point 38, the thrust level is increased.

Figure 10:
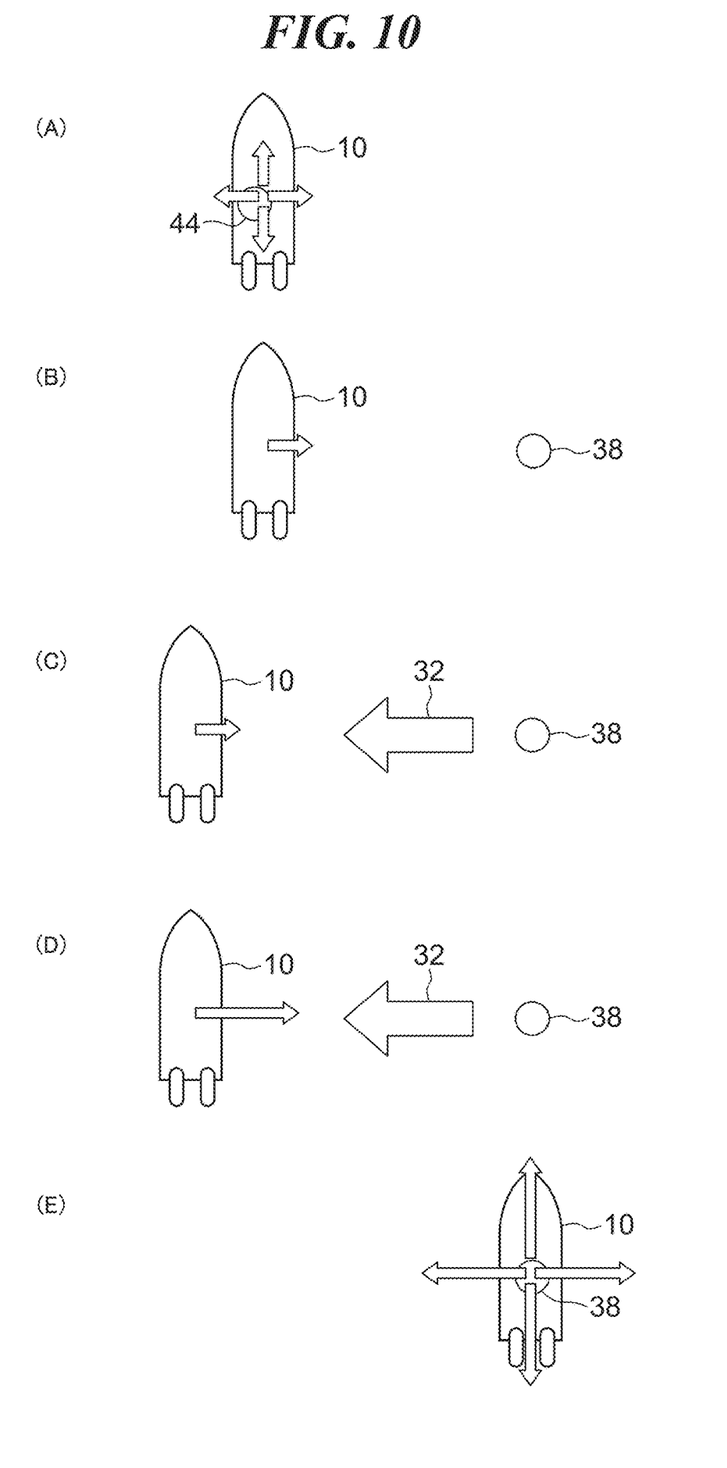
FIG. 10 is a step diagram for explaining a change in a thrust level during execution of the fine tuning.

FIG. 10 is a step diagram for explaining a change in a thrust level during execution of the fine tuning. In FIG. 10, the magnitude of the thrust level is indicated by the length of an arrow. First, during the execution of the fixed point holding control, the marine vessel 10 causes the each engine 14 to generate thrust of a set thrust level, and stays near the current target point 44 ((A) in FIG. 10).

Thereafter, when fine tuning is executed in accordance with the setting of the new target point 38 by the vessel operator, the marine vessel 10 causes each engine 14 to generate thrust of the set thrust level, and starts to move toward the new target point 38 ((B) in FIG. 10). Then, in a case where the marine vessel 10 moves away from the new target point 38 due to the disturbance 32 during movement ((C) in FIG. 10), the BCU 17 increases the thrust level to increase the thrust to move toward the new target point 38 ((D) in FIG. 10). At this time, the thrust level is raised stepwise. Specifically, if the marine vessel 10 still moves away from the new target point 38 even when the thrust level is raised by one level, the BCU 17 raises the thrust level by another one level. Then, the steps (B) to (D) in FIG. 10 are repeated until the marine vessel 10 moves toward the new target point 38 at a predetermined speed or more. When the marine vessel 10 begins to move at a predetermined speed or more toward the new target point 38, the BCU 17 fixes the thrust level to the current value and continues the movement of the marine vessel 10 to the new target point 38. Note that the BCU 17 determines that the marine vessel 10 moves away from the new target point 38 and whether or not the vessel speed of the marine vessel 10 toward the new target point 38 is equal to or higher than a predetermined speed based on the current position of the marine vessel 10 determined by the GPS 19.

Thereafter, when the marine vessel 10 reaches the new target point 38 (precisely speaking, when the remaining distance falls below the allowable distance), the BCU 17 terminates the fine tuning and resumes the fixed point holding control at the new target point 38. At this time, the BCU 17 maintains the thrust level at the thrust level applied to the movement to the new target point 38 ((E) in FIG. 10).

In the present preferred embodiment, in a case where the marine vessel 10 moves away from the new target point 38 during execution of the fine tuning, the thrust level is raised. Therefore, it is possible to avoid a state in which the marine vessel 10 does not swiftly reach the new target point 38, and as a result, a change in the remaining distance 40 displayed by the dialog 39 is not delayed. Therefore, the vessel operator is able to easily realize that the marine vessel 10 is moving toward the new target point 38.

In addition, at the new target point 38, there is a high possibility that the marine vessel 10 receives the same level of disturbance as the disturbance 32 it receives during the movement. In order to cope with this, in the present preferred embodiment, after the marine vessel 10 reaches the new target point 38, the thrust level applied to the fixed point holding control is maintained at the thrust level applied to the movement to the new target point 38. As a result, it is possible to prevent the position of the marine vessel 10 from being unable to be held at the new target point 38 due to the thrust level being too low with respect to the disturbance.

Note that the marine vessel 10 may include a device (disturbance detection detector) to detect the disturbance 32, such as an anemometer, a water flow sensor, or a wind sensor, and when the BCU 17 determines that the level of the disturbance 32 has decreased based on the detection results after the marine vessel 10 reaches the new target point 38, the BCU 17 may decrease the thrust level. As a result, it is possible to reduce or prevent the marine vessel 10 excessively moving in the fixed point holding control at the new target point 38. Specifically, during the Fish Point™, the occurrence of foaming caused by unnecessary propeller 15 rotation is reduced so that fish are unlikely to be driven away.

In the steps (A) to (E) of FIG. 10, the thrust level is raised in a case where the marine vessel 10 moves away from the new target point 38. However, the thrust level may be raised in a case where the moving speed of the marine vessel 10 to the new target point 38 is lower than the predetermined speed.

Although preferred embodiments of the present invention have been described above, the present invention is not limited to the above-described preferred embodiments, and various modifications and changes can be made within the scope of the gist of the present invention.

For example, although the marine vessel propulsion control system 16 is applied to the marine vessel 10 including the outboard motor 12, the type of marine vessel to which it is applied is not limited, and the marine vessel propulsion control system 16 may be applied to a marine vessel including an inboard/outboard motor or an inboard motor.

Further, preferred embodiments of the present invention may be implemented by reading a program to implement the functions of the above-described preferred embodiments from a memory or the like included in the BCU 17 and executing the program by the BCU 17, or may be implemented by supplying a program to implement the functions of the above-described preferred embodiments to the marine vessel propulsion control system 16 via a network or a storage medium and executing the supplied program by the BCU 17. Furthermore, preferred embodiments of the present invention may also be realized by a circuit (for example, an ASIC) that achieves one or more functions of the BCU 17.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A marine vessel comprising:
    a marine vessel propulsion control system including:
        a display;
        at least one memory to store a set of instructions; and
        a controller configured or programmed to execute the set of instructions to control movement of the marine vessel, and to execute a fixed point holding control to restrict movement of the marine vessel to keep the marine vessel at a predetermined position; wherein
    when a target position is newly set during execution of the fixed point holding control, the controller is configured or programmed to execute a control to move the marine vessel to the target position;
    the display is operable to display a remaining distance from the marine vessel to the target position as the marine vessel is moving to the target position;
    the controller is configured or programmed to change, according to a movement state of the marine vessel to the target position, a thrust level to be generated by a propulsion device of the marine vessel during execution of the fixed point holding control;
    when the marine vessel is moving to the target position, the display displays a deviation of a current bow direction of the marine vessel with respect to a bow direction of the marine vessel at a time point when the target position is set; and
    the fixed point holding control causes the marine vessel to stay at the predetermined position, or causes the marine vessel to stay at the predetermined position and maintain a bow direction of the marine vessel in a predetermined direction.

2. The marine vessel according to claim 1, wherein, when the marine vessel is moving to the target position, the controller is configured or programmed to increase the thrust level in a case where the marine vessel is moving away from the target position.

3. The marine vessel according to claim 1, wherein, when the marine vessel is moving to the target position, the controller is configured or programmed to increase the thrust level in a case where a moving speed of the marine vessel decreases.

4. The marine vessel according to claim 1, wherein the controller is configured or programmed to maintain the thrust level applied during movement of the marine vessel to the target position even after the marine vessel reaches the target position.

5. The marine vessel according to claim 1, wherein
    the marine vessel propulsion control system further includes a disturbance detector to detect a disturbance acting on the marine vessel; and
    when the disturbance detector detects a decrease in a level of the disturbance after the marine vessel reaches the target position, the controller is configured or programmed to decrease the thrust level.

6. The marine vessel according to claim 1, wherein, when the marine vessel reaches a position within a range of a predetermined allowable distance from the target position, the display displays the remaining distance as 0.

7. The marine vessel according to claim 1, wherein, when the marine vessel reaches a position within a range of a predetermined allowable distance from the target position, the display stops displaying the remaining distance.

8. The marine vessel according to claim 6, wherein, when the marine vessel is moving to the target position, the display displays the remaining distance by converting an actual remaining distance from the marine vessel to the target position so that the remaining distance represents 0 when the marine vessel reaches the position within the range of the predetermined allowable distance from the target position.

9. The marine vessel according to claim 6, wherein the predetermined allowable distance changes according to an amount of movement of the target position when a joystick is tilted once when the target position is set.

10. The marine vessel according to claim 6, wherein the predetermined allowable distance changes according to the thrust level.

11. The marine vessel according to claim 1, wherein, when the marine vessel is moving to the target position, the display displays only a component of an actual distance from the marine vessel to the target position that is along a direction from a position of the marine vessel at a time point when the target position was set.

12. The marine vessel according to claim 1, wherein, when the marine vessel is moving to the target position, the display displays an operation state of the propulsion device of the marine vessel.

13. A marine vessel propulsion control system comprising:
    a display;
    at least one memory to store a set of instructions; and
    a controller configured or programmed to execute the set of instructions to control movement of the marine vessel, and to execute a fixed point holding control to restrict movement of the marine vessel so as to keep the marine vessel at a predetermined position; wherein
    when a target position is newly set during execution of the fixed point holding control, the controller is configured or programmed to execute a control to move the marine vessel to the target position;

the display is operable to display a remaining distance from the marine vessel to the target position as the marine vessel is moving to the target position;

the controller is configured or programmed to change, according to a movement state of the marine vessel to the target position, a thrust level to be generated by a propulsion device of the marine vessel during execution of the fixed point holding control;

when the marine vessel is moving to the target position, the display displays a deviation of a current bow direction of the marine vessel with respect to a bow direction of the marine vessel at a time point when the target position is set; and the fixed point holding control causes the marine vessel to stay at the predetermined position, or causes the marine vessel to stay at the predetermined position and maintain a bow direction of the marine vessel in a predetermined direction.

* * * * *